(12) United States Patent
Wang et al.

(10) Patent No.: US 10,627,690 B2
(45) Date of Patent: Apr. 21, 2020

(54) LIQUID CRYSTAL DISPLAY PANEL AND DISPLAY DEVICE

(71) Applicant: SHANGHAI TIANMA MICRO-ELECTRONICS CO., LTD., Shanghai (CN)

(72) Inventors: Lei Wang, Shanghai (CN); Xiangjian Kong, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 136 days.

(21) Appl. No.: 15/880,597

(22) Filed: Jan. 26, 2018

(65) Prior Publication Data

US 2019/0101789 A1    Apr. 4, 2019

(30) Foreign Application Priority Data

Sep. 29, 2017    (CN) .......................... 2017 1 0907942

(51) Int. Cl.
*G02F 1/1335*    (2006.01)
*G02F 1/1362*    (2006.01)
*G02F 1/1368*    (2006.01)

(52) U.S. Cl.
CPC ...... *G02F 1/136286* (2013.01); *G02F 1/1368* (2013.01); *G02F 1/133514* (2013.01);
(Continued)

(58) Field of Classification Search
CPC ......... G02F 1/136286; G02F 1/133514; G02F 2001/136222; G02F 2201/52;
(Continued)

(56) References Cited

U.S. PATENT DOCUMENTS

2007/0008462 A1*  1/2007  Yang ................. G02F 1/133514
                                                             349/106
2012/0224128 A1*  9/2012  Jung ................. G02F 1/134309
                                                             349/129
(Continued)

FOREIGN PATENT DOCUMENTS

CN        1892263 A        1/2007
CN     101339344 A    *    1/2009

OTHER PUBLICATIONS

Office Action of Chinese Patent Application No. 201710907942.1 dated Nov. 1, 2019.

*Primary Examiner* — Jia X Pan
(74) *Attorney, Agent, or Firm* — Kilpatrick Townsend Stockton, LLP

(57) ABSTRACT

The present disclosure provides a liquid crystal display panel including an array substrate and a color filter layer. The array substrate includes sub-pixels arranged in array. Each sub-pixel includes an upper driving region and a lower driving region arranged adjacent to one another and have substantially the same area. The color filter layer includes an upper color region, a lower color region, and an auxiliary color region, respectively corresponding to main aperture region of the upper driving region, lower driving region, and auxiliary aperture region of the upper driving region. The color of the upper color region is different from colors of the lower color region and the auxiliary color region respectively. The upper driving region includes two aperture regions corresponding to color zones of different colors, which can realize multi-color display under low power consumption, and can meanwhile alleviate the problem of image flicker under a low frequency.

13 Claims, 10 Drawing Sheets

(52) U.S. Cl.
 CPC .. *G02F 1/133553* (2013.01); *G02F 2201/121* (2013.01); *G02F 2201/123* (2013.01)

(58) Field of Classification Search
 CPC ................ G02F 1/1368; G09G 3/2003; G09G 2300/0452; G09G 2300/0443; G09G 3/3607; G09G 3/3611; G09G 5/02; G02B 5/201; H01L 27/322; H01L 27/3213; H01L 27/3218; H01L 27/3211
 See application file for complete search history.

(56) References Cited

U.S. PATENT DOCUMENTS

| | | | |
|---|---|---|---|
| 2014/0055696 A1* | 2/2014 | Lee | G02F 1/136286 349/20 |
| 2015/0109554 A1* | 4/2015 | Lee | H01L 27/124 349/48 |
| 2015/0185546 A1* | 7/2015 | Lee | G02F 1/13363 349/33 |

* cited by examiner

LIQUID CRYSTAL DISPLAY PANEL AND DISPLAY DEVICE

CROSS-REFERENCE TO RELATED APPLICATIONS

The present application claims priority to Chinese Patent Application No. 201710907942.1, filed on Sep. 29, 2017, the content of which is incorporated herein by reference in its entirety.

TECHNICAL FIELD

The present disclosure relates to the field of display technologies and, particularly, to a liquid crystal display panel with low power consumption, and a display device.

BACKGROUND

With the development of science and technology, display devices with display functions have wider uses. For a display device, color display provides more information and better visual experience to users than black-white display. Take liquid crystal displays (LCD) as an example, a general color display makes use of color filters to form color images, where the three-primary colors are mixed by use of the principle of spatial color mixing.

In one embodiment, the imaging principle of traditional LCDs is placing liquid crystals between an array substrate and a color film substrate, and causing an electric field effect of liquid crystal molecules driven by an electric field produced between two electrodes therein to control transmitting or shielding function of the light source so as to display the images. Compared with monochrome LCDs, color filters or a color filter layer is added to color LCDs. Each of the pixel units is generally composed of three sub-pixels, which respectively correspond to the three color filter areas of red (R), green (G), and blue (B) on the color filters. Red (R), green (G), and blue (B) signals of the images provided by a driver integrated circuit drive corresponding sub-pixels respectively. A white light source displays different colors after passing through the color filter areas of different colors on the color filters to display color images. Furthermore, traditional red (R), green (G), and blue (B) tri-color liquid crystal displays configure different driving voltages by the driver integrated circuit to drive the liquid crystal displays to display different gray scales. Based on the three colors of red (R), green (G), and blue (B), different colors are displayed by different gray scales, so as to display multiple colors. At least four gray scale voltages may be required to realize a 64-color display, of which the power consumption is high. If the power consumption is reduced by means of reducing frequency, electric leakage of pixels would occur, which would cause an abnormal display brightness of the middle gray scales and then an abnormal image color.

SUMMARY

The present disclosure provides a liquid crystal display panel, and a display device, to realize multi-color display under a low power consumption and to solve the problem of image flicker under low frequency driving.

A first aspect of the present disclosure provides a liquid crystal display panel, including an array substrate. The array substrate includes a plurality of data lines and a plurality of scan lines. The data lines and the scan lines intersect with one another to form a plurality of pixel units arranged in an array. The array substrate further includes a color filter layer including an upper color region, a lower color region and an auxiliary color region. The pixel units each includes at least one sub-pixel, and the at least one sub-pixel each has a pixel electrode arranged therein. The at least one sub-pixel each includes an upper driving region and a lower driving region that are arranged adjacent to one another. The upper driving region and the lower driving region are arranged in an extending direction of the data lines and have substantially the same area. The upper driving region includes a main aperture region and an auxiliary aperture region, and the upper color region, the lower color region, and the auxiliary color region respectively correspond to the main aperture region of the upper driving region, the lower driving region, and the auxiliary aperture region of the upper driving region. The upper color region has a color different from the lower color region and the auxiliary color region, respectively.

A second aspect of the present disclosure further provides a display device, including a liquid crystal display panel. The liquid crystal display panel includes an array substrate including a plurality of data lines and a plurality of scan lines. The data lines and the scan lines intersecting with one another to form a plurality of pixel units arranged in an array. The array substrate further includes a color filter layer including an upper color region, a lower color region and an auxiliary color region. The pixel units each includes at least one sub-pixel, and the at least one sub-pixel each has a pixel electrode arranged therein. The at least one sub-pixel each includes an upper driving region and a lower driving region that are arranged adjacent to one another. The upper driving region and the lower driving region are arranged in an extending direction of the data lines and have substantially the same area. The upper driving region includes a main aperture region and an auxiliary aperture region, and the upper color region, the lower color region, and the auxiliary color region respectively correspond to the main aperture region of the upper driving region, the lower driving region, and the auxiliary aperture region of the upper driving region. The upper color region has a color different from the lower color region and the auxiliary color region, respectively.

In some embodiments, the liquid crystal display panel provided by the present disclosure includes an array substrate and a color filter layer, the array substrate includes data lines and scan lines intersect with each other to form a plurality of pixel units arranged in an array. The pixel units include at least one sub-pixel, each of which has a pixel electrode arranged therein. Each of the sub-pixels includes an upper driving region and a lower driving region that are arranged adjacent to one another, the upper driving region and the lower driving region are arranged in the extending direction of the data lines and have substantially the same area. The upper driving region includes a main aperture region and an auxiliary aperture region, and the color filter layer includes an upper color region, a lower color region, and an auxiliary color region, which respectively correspond to the main aperture region of the upper driving region, the lower driving region, and the auxiliary aperture region of the upper driving region. The upper color region has a color different from the lower color region and the auxiliary color region. That is to say, each of the sub-pixels includes two driving regions that can display different colors. The upper driving region further includes two aperture regions corresponding to different color zones, so that more colors can be displayed, and multi-color display is realized. Meanwhile, since the upper driving region and the lower driving region have substantially the same area or a very small area difference, the sizes of storage capacitances and liquid crystal capacitances of the upper driving region and the lower driving region are substantially the same, which can solve the problem of image flicker under a low frequency caused by a large difference between the storage capacitances or the liquid crystal capacitances of the upper driving region and the lower driving region.

DESCRIPTION OF EMBODIMENTS

The present disclosure is described in detail as below with reference to the accompanying drawings and embodiments. It should be understood that the detailed embodiments hereinafter are only exemplary, and they do not limit the present disclosure. In addition, it should be understood that, for the convenience of description, the drawings only show the parts, instead of the entire structure, related to the present disclosure.

Figure 1:
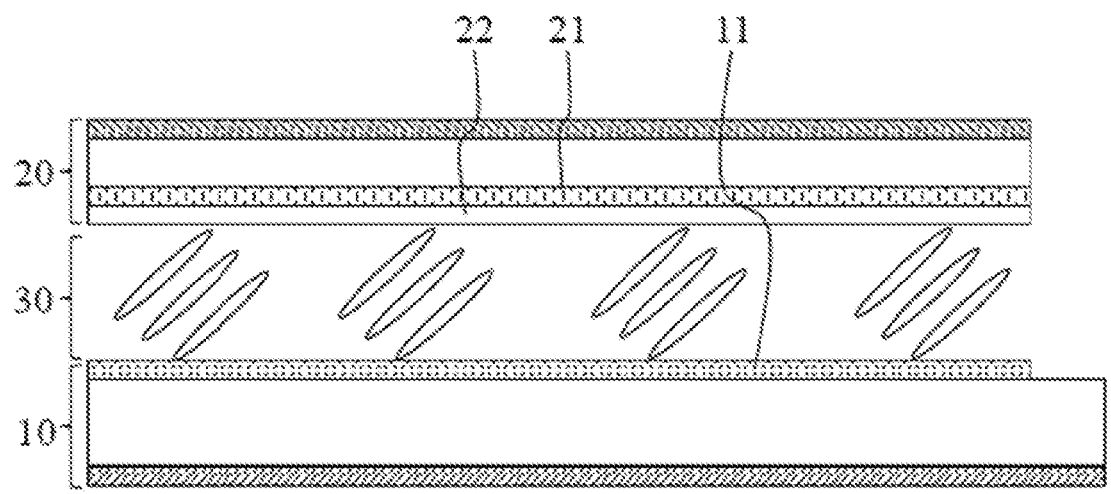
FIG. 1 illustrates a schematic diagram of a liquid crystal display panel provided in an embodiment of the present disclosure.
Figure 2:
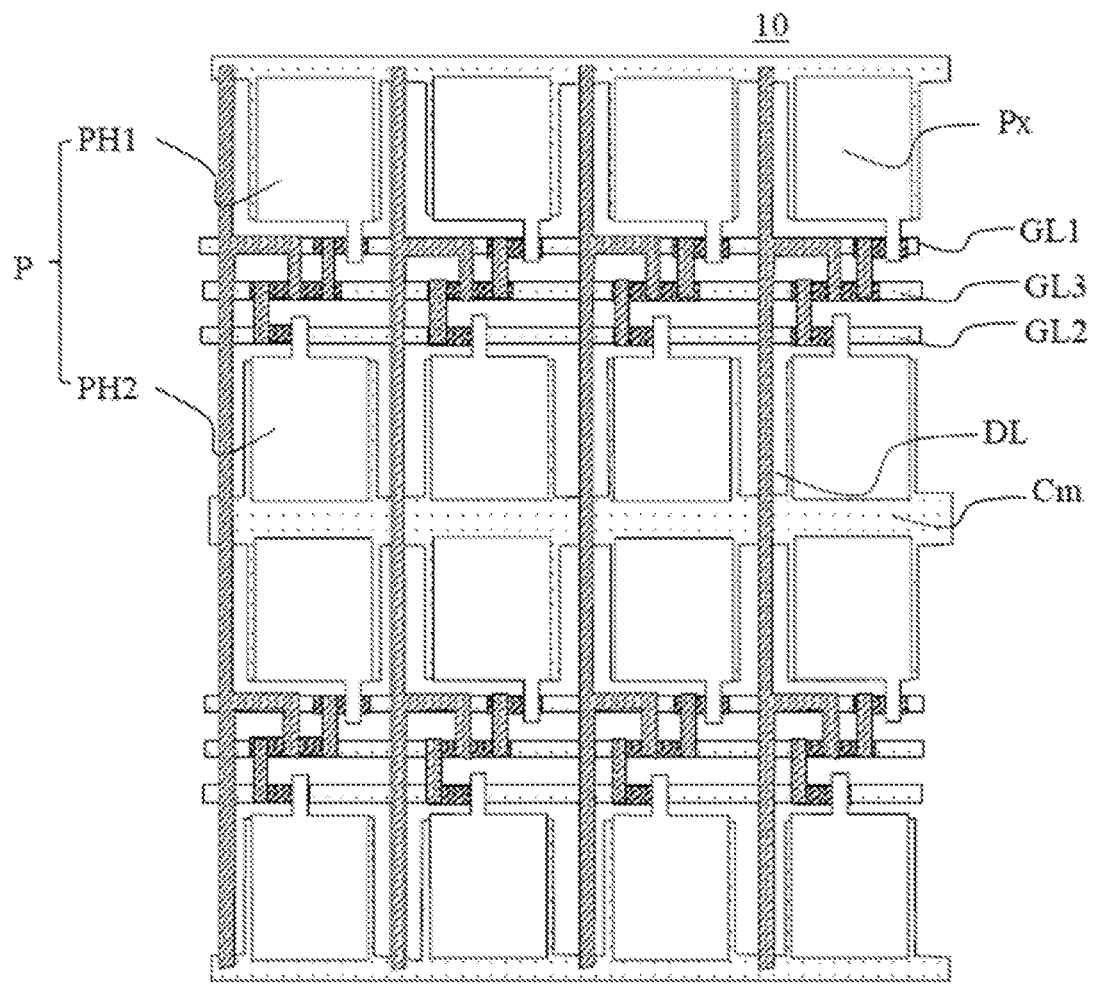
FIG. 2 illustrates a schematic diagram of an array substrate in a liquid crystal display panel provided in an embodiment of the present disclosure.

At first, the present disclosure provides a liquid crystal display panel, as shown in FIGS. 1 and 2. FIG. 1 illustrates a schematic diagram of a liquid crystal display panel provided in an embodiment of the present disclosure, and FIG. 2 illustrates a schematic diagram of an array substrate in a liquid crystal display panel provided in an embodiment of the present disclosure. In this embodiment, a reflective liquid crystal display panel is taken as an example, i.e. the liquid crystal display panel is a reflective liquid crystal display panel, which includes an array substrate 10, a color film substrate 20, and a liquid crystal layer 30 arranged between the array substrate 10 and the color film substrate 20 and sealed in a box-shaped space formed by the array substrate 10 and the color film substrate 20.

The array substrate 10 can have a structure as shown in FIG. 2, and includes a drive array arranged on a lower substrate. The drive array includes a plurality of data lines DL arranged parallel to one another and a plurality of scan lines GL arranged parallel to one another. The plurality of data lines DL and the plurality of scan lines GL intersect with each other to define a plurality of pixel units arranged in an array. Each of the pixel units at least includes a sub-pixel P, each sub-pixel P includes at least one scan line GL, at least one data line DL, at least one switch element, and at least one pixel electrode Px.

The color film substrate 20 includes a color filter layer 21 and a common electrode 22 arranged on an upper substrate. For example, the common electrode 22 can be placed on a side of the color filter layer 21 away from the upper substrate and covers the color filter layer 21. The color filter layer 21 includes a plurality of color zones of different colors, which respectively correspond to different sub-pixels P or to different regions in each of the sub-pixels P. In the present embodiment, the color filter layer is arranged on the color film substrate. Certainly, the color filter layer can also be placed, for example, on the array substrate, which is not limited in the present disclosure.

Furthermore, the liquid crystal display panel further includes a reflecting layer 11 arranged on the array substrate 10. The reflecting layer 11 can be placed, for example, on a side of the drive array facing away from the lower substrate and covers the drive array, or can be placed on a side of the drive array facing towards the lower substrate and is directly formed on one side of the lower substrate, i.e. the reflecting layer 11 is placed between the lower substrate and the color filter layer. The color filter layer 21 is placed on a side of the reflecting layer 11 facing towards the liquid crystal layer and is used for reflecting external light and for allowing the reflected light rays to go through the color filter layer, and the external light is, for example, external natural light. The reflecting layer, for example, is formed by evaporation from metallic materials such as aluminum, silver, etc., or is formed from a compound or an alloy contains a metallic material such as aluminum, silver, etc. as one of the compositions.

In the present embodiment, the pixel electrode is formed, for example, from a transparent conductive metallic oxide material such as indium tin oxide, etc., the scan lines and the data lines can, but not limited to, be made from metallic materials. They can also be made from alloys, nitrides of a metallic material, oxides of a metallic material, nitric oxides of a metallic material, or stacked layers of a metallic material and other conductive materials.

Figure 3:
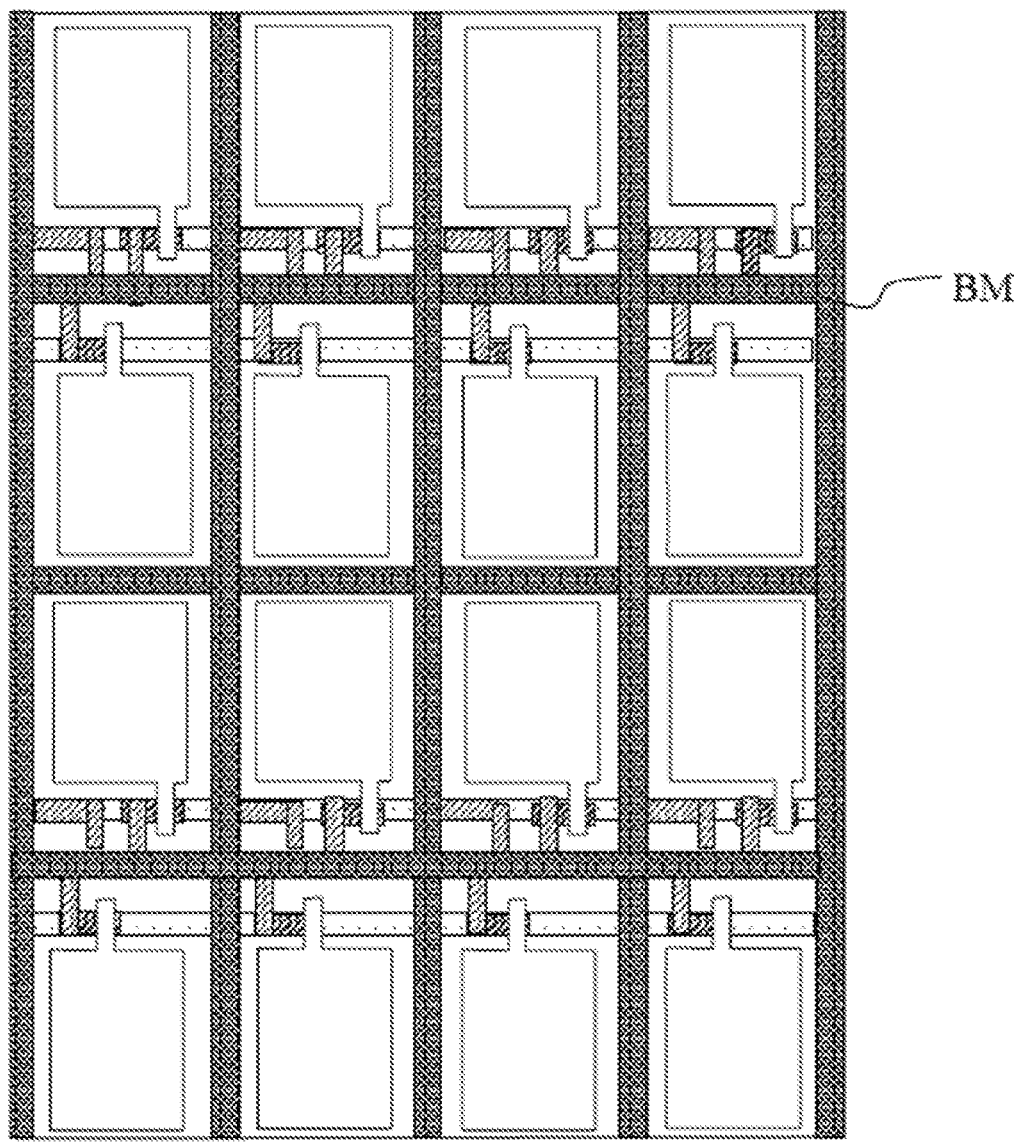
FIG. 3 illustrates a schematic diagram of a black matrix provided in an embodiment of the present disclosure.
Figure 4:
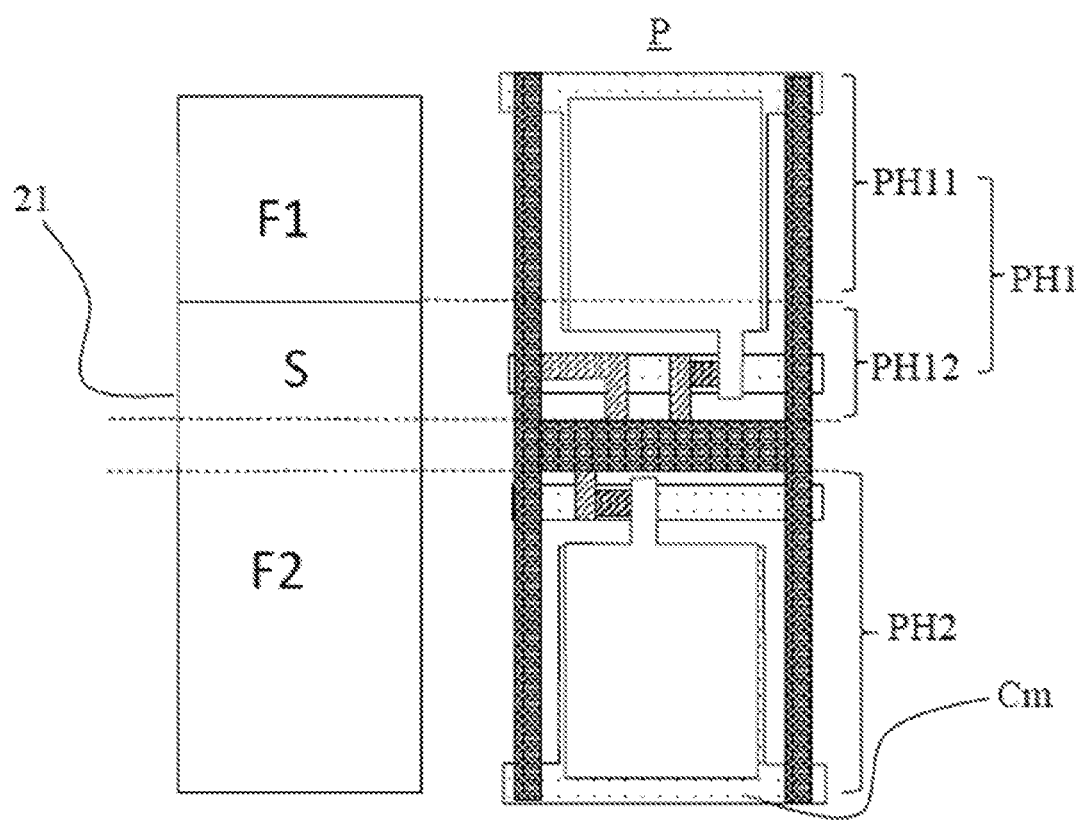
FIG. 4 illustrates a schematic diagram of correspondence of a color filter layer and a sub-pixel provided in an embodiment of the present disclosure.
Figure 5:
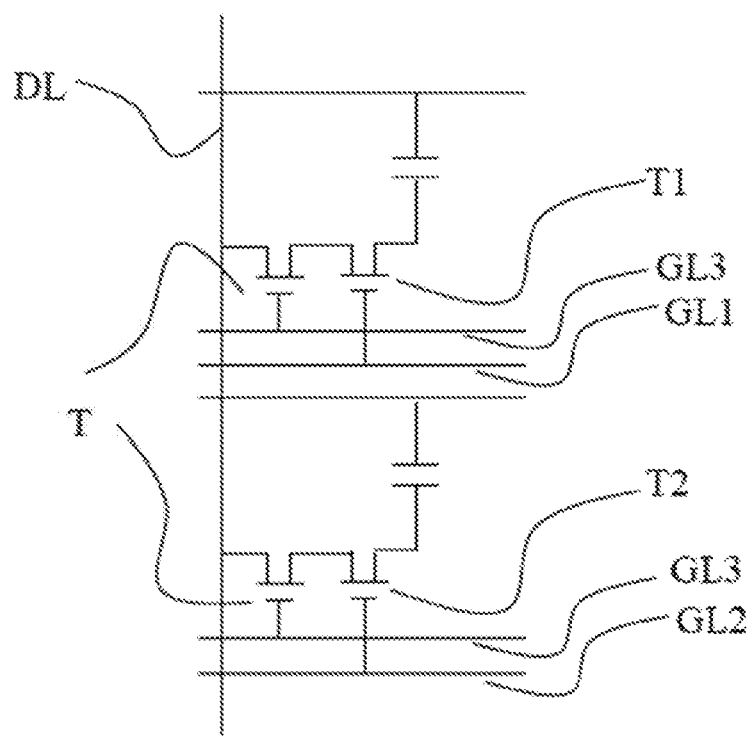
FIG. 5 illustrates a schematic diagram of a drive circuit in an individual sub-pixel provided in an embodiment of the present disclosure.

Furthermore, FIG. 3 illustrates a schematic diagram of a black matrix provided in an embodiment of the present disclosure, FIG. 4 illustrates a schematic diagram of correspondence of a color filter layer and a sub-pixel provided in an embodiment of the present disclosure, and FIG. 5 illustrates a schematic diagram of a drive circuit in an individual sub-pixel provided in an embodiment of the present disclosure. Referring to FIGS. 1 to 5 at the same time, the pixel units arranged in an array at least include a sub-pixel P. The sub-pixel P includes an upper driving region PH1 and a lower driving region PH2 that are arranged adjacent to one another. The upper driving region PH1 and the lower driving region PH2 are arranged in an extending direction of the data lines DL and are between two adjacent data lines DL, and have substantially the same area.

In an embodiment, each of the sub-pixels includes: two independent pixel electrodes Px, which are respectively arranged in the upper driving region PH1 and the lower driving region PH2; a main thin film transistor T, a first auxiliary thin film transistor T1, and a second auxiliary thin film transistor T2; and a first scan line GL1, a second scan line GL2, and a main scan line GL3 arranged between the upper driving region PH1 and the lower driving region PH2. A gate electrode of the main thin film transistor T is connected to the main scan line GL3, and a source electrode of the main thin film transistor T is connected to the data line DL corresponding to the sub-pixel P. The main thin film transistor T includes a first drain electrode and a second drain electrode. The first drain electrode of the main thin film transistor T is connected to the source electrode of the first auxiliary thin film transistor T1, and the second drain electrode of the main thin film transistor T is connected to the source electrode of the second auxiliary thin film transistor T2. The gate electrode of the first auxiliary thin film transistor T1 is connected to the first scan line GL1, the source electrode of the first auxiliary thin film transistor T1 is connected to the first drain electrode of the main thin film transistor T, and the drain electrode of the first auxiliary thin film transistor T1 is connected to the pixel electrode Px corresponding to the upper driving region PH1. The gate electrode of the second auxiliary thin film transistor T2 is connected to the second scan line GL2, the source electrode of the second auxiliary thin film transistor T2 is connected to the second drain electrode of the main thin film transistor T, and the drain electrode of the second auxiliary thin film transistor T2 is connected to the pixel electrode Px corresponding to the lower driving region PH2. In other words, in the present embodiment, the drive array of the liquid crystal display panel drives the upper driving region PH1 via the main thin film transistor T and the first auxiliary thin film transistor T1, and drives the lower driving region PH2 via the main thin film transistor T and the second auxiliary thin film transistor T2. The main thin film transistor T is a common thin film transistor for the upper driving region PH1 and the lower driving region PH2.

Furthermore, the drive array of the liquid crystal display panel further includes a storage electrode Cm, which at the same time overlaps with the pixel electrodes Px in the upper driving region PH1 and the lower driving region PH2 respectively to form a storage capacitor. In the present embodiment, the storage electrode Cm can, for example, be formed at the same layer with the scan lines, and can be made from metallic materials, alloys, nitrides of a metallic material, oxides of a metallic material, nitric oxides of a metallic material, or can be stacked layers of a metallic material and other conductive materials, or a transparent conductive layer additionally configured. In the driving process, the storage electrode Cm can, for example, have the same potential with the common electrode, i.e. it can be connected to the common electrode via a common signal line.

In an embodiment, the areas of the upper driving region PH1 and the lower driving region PH2 are substantially the same, which can form substantially the same liquid crystal capacitances. In addition, the areas of the storage electrodes in the upper driving region PH1 and the lower driving region PH2 overlapping with the pixel electrodes can be substantially the same by properly arranging the storage electrode Cm, so that the storage capacitances formed in the upper driving region PH1 and in the lower driving region PH2 are substantially the same, which can improve display uniformity.

The liquid crystal display panel further includes light-proof black matrixes BM, which can, for example, be located on the color film substrate or on the array substrate. The black matrixes BM are arranged in an array for separating apart adjacent sub-pixels or different driving regions in the same sub-pixel, so as to prevent color mixture.

In a reflective liquid crystal display panel, it is also possible that there is no black matrix BM provided. Instead, different driving regions of adjacent sub-pixels or of the same sub-pixel can be spaced from each other by arranging the reflective layers in interval. The reflective layer is only provided in each driving region, and the reflective layers of adjacent driving regions are spaced from each other with a certain interval there between, so that an interval region between adjacent driving regions is kept to form a dark region which does not reflect light, thereby preventing color mixture in different driving regions of adjacent sub-pixels or of the same sub-pixel.

Furthermore, in the present embodiment, the color filter layer 21 includes an upper color region F1, an auxiliary color region S, and a lower color region F2 that are arranged adjacent to one another. The upper color region F1 corresponds to a portion of the upper driving region PH1, the auxiliary color region S corresponds to the remaining portion of the upper driving region PH1, and the lower color region F2 corresponds to the lower driving region PH2. The portion of the upper driving region PH1 corresponding to the upper color region F1 is named as the main aperture region PH11, and the remaining portion of the upper driving region PH1 corresponding to the auxiliary color region S is named as the auxiliary aperture region PH12.

In the present embodiment, the auxiliary aperture region PH12 of the upper driving region PH1 is located between the main aperture region PH11 of the upper driving region PH1 and the lower driving region PH2, i.e. the auxiliary color region S is located between the upper color region F1 and the lower color region F2. The upper color region F1 and the lower color region F2 are different in color, and the auxiliary color region S and the lower color region F2 are identical in color.

A potential difference is formed between the pixel electrode and the common electrode by the signals from the first scan line and the main scan line passing through the main thin film transistor T and the first auxiliary thin film transistor T1 driving the pixel electrode Px in the upper driving region PH1, or by the signals from the second scan line and the main scan line passing through the main thin film transistor T and the second auxiliary thin film transistor T2 driving the pixel electrode Px in the lower driving region PH2, and by the signals from the data lines, so as to drive the liquid crystal molecules in the liquid crystal layer to change their states. Under such a state, the external light incident from a side of the color film substrate reaches at the reflecting layer of the array substrate via the liquid crystal layer, is reflected to the liquid crystal layer by the reflecting layer, and is thus displayed as images according to the angle configuration of the liquid crystal molecules in the liquid crystal layer. With respect to each of the driving regions in the sub-pixel, under driven of the voltage difference between the pixel electrode and the common electrode, the liquid crystal molecules in the liquid crystal layer change their states, such as being rotated and/or twisted and, meanwhile, together with a light deflecting device on the upper substrate, make each of the driving regions have a close state and an open state in time division. When a driving region is in a close state, the light reflected from the reflecting layer may not pass through the driving region, during which this driving region displays a black color. When a driving region is in an open state, the light reflected from the reflecting layer passes through the driving region, during which this driving region displays the color of its corresponding color zone. Each of the driving regions displays black color or other colors according to the requirements for displaying different images, by controlling the data signals provided by the data lines electrically connected to each of the driving regions.

For example, the upper driving region PH1 and the lower driving region PH2 in the sub-pixel can be in a close state at the same time by controlling the voltage difference between the pixel electrode and the common electrode, during which the upper driving region PH1 and the lower driving region PH2 display black color at the same time, i.e. the sub-pixel displays black color. In another embodiment, the upper driving region PH1 and the lower driving region PH2 in the sub-pixel can be in an opening state at the same time by controlling the voltage difference between the pixel electrode and the common electrode, so that the light reflected from the reflecting layer passes through the upper driving region PH1 and the lower driving region PH2, during which the upper driving region PH1 and the lower driving region PH2 display the colors of their corresponding color zones respectively, i.e. the main aperture region PH11 of the upper driving region PH1 displays the color of the upper color region F1, the auxiliary aperture region PH12 of the upper driving region PH1 displays the color of the auxiliary color region S, and the lower driving region PH2 displays the color of the lower color region F2. At this moment, the color of the sub-pixel is a mixed color of the colors of the upper color region F1, the auxiliary color region S, and the lower color region F2. In another embodiment, the upper driving region PH1 in the sub-pixel can be in an open state and the lower driving region PH2 in the sub-pixel can be in a close state by controlling the voltage difference between the pixel electrode and the common electrode, so that the main aperture region PH11 of the upper driving region PH1 displays the color of the upper color region F1, and the auxiliary aperture region PH12 of the upper driving region PH1 displays the color of the auxiliary color region S. At this moment, the color of the sub-pixel is a mixed color of the colors of the upper color region F1 and the auxiliary color region S. Since the lower driving region PH2 is in a dark state at this moment, only the light from the auxiliary aperture region PH12 of the upper driving region PH1 passes through the auxiliary color region S, and no light passes through the lower color region F2 which has the same color with the auxiliary color region S. Since different amount of light passing through the color filter produce different brightness, the human eyes will perceive different colors. Therefore, even though the colors of the auxiliary color region S and the lower color region F2 are identical to one another, the mixed color produced at this moment is different from the mixed color produced when the upper driving region PH1 and the lower driving region PH2 are in open states simultaneously. In another embodiment, the upper driving region PH1 in the first sub-pixel can be in a close state and the lower driving region PH2 in the first sub-pixel can be in an open state by controlling the voltage difference between the pixel electrode and the common electrode, so that the upper driving region PH1 displays black color, and the lower driving region PH2 displays the color of the lower color region F2, during which the color of the sub-pixel is the color of the lower color region F2 at this moment. Consequently, each of the sub-pixels can display four types of colors at most: black color; a mixed color of the colors of the upper color region F1, the auxiliary color region S, and the lower color region F2; a mixed color of the colors of the upper color region F1 and the auxiliary color region S; and the color of the lower color region F2.

The liquid crystal display panel provided in an embodiment uses a solution of segmentation of area of the driving region and segmentation of the color filter layer, so that a multi-color display can be realized by only providing a high voltage and a low voltage to control each of the driving regions so that it is in a bright state or a dark state, which can reduce power consumption of the drive circuit in the liquid crystal display panel and realizes a multi-color display under ultra-low power consumption. Meanwhile, the voltages of the brightest state and the darkest state of the liquid crystal display panel have little influence on the brightness, i.e. the brightness variation is insensitive to the voltage variation, so the brightness variation is small even under electric leakage. Thus, driving in a lower frequency can be realized so as to further reduce power consumption of the driving. In addition, since the two driving regions in each of the sub-pixels in the liquid crystal display panel provided in the present embodiment have the same size, the storage capacitance and the liquid crystal capacitance can be maintained identical to one another. When electric leakage at low frequency occurs, the two driving regions have the same leakage performance, and the corresponding common voltages are identical to one another as well, so that problems such as flicker, image sticking, etc. may not occur, and display performance is improved.

The above embodiments take the reflective liquid crystal display panel as an example to introduce a technical solution of segmentation of area of the driving region and segmentation of the color filter layer provided by the present disclosure. Certainly, the liquid crystal display panel can also be a trans reflective liquid crystal display panel, which is not limited in the present disclosure.

The liquid crystal layer 30 can, for example, uses different modes such as electrically controlled birefringence (Electrically Controlled Birefringence, ECB), twisted nematic (Twisted Nematic, TN), vertical alignment (Vertical Alignment, VA), etc. For example, the liquid crystal layer can be in a twisted nematic (TN)—normally white (NW) mode.

Figure 6:
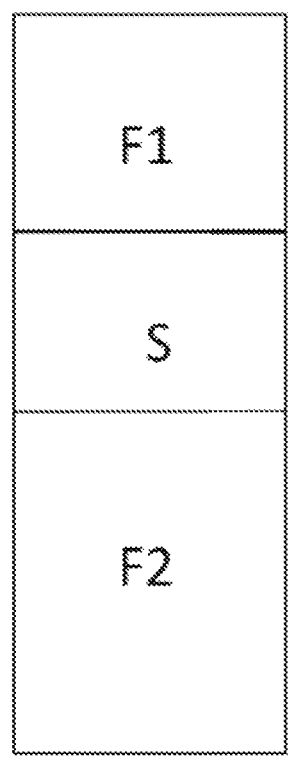
FIG. 6 illustrates a schematic diagram of formation of a color filter layer provided in another embodiment of the present disclosure.

FIG. 6 illustrates a structural schematic diagram of a color filter layer provided in another embodiment of the present disclosure. In the present embodiment, the color filter layer includes an upper color region F1, a lower color region F2, and an auxiliary color region S located between the upper color region F1 and the lower color region F2. The auxiliary color region S is a white light region. The upper color region F1 corresponds to the main aperture region PH11 of the upper driving region PH1, the lower color region F2 corresponds to the lower driving region PH2, and the auxiliary color region S corresponds to the auxiliary aperture region PH12 of the upper driving region PH1. The upper color region F1 and the lower color region F2 are different in color.

In the present embodiment, the upper driving region PH1 and the lower driving region PH2 in the sub-pixel can be in a close state at the same time by controlling the voltage difference between the pixel electrode and the common electrode, during which the upper driving region PH1 and the lower driving region PH2 display black color at the same time, i.e. the sub-pixel displays black color. In another embodiment, the upper driving region PH1 and the lower driving region PH2 in the sub-pixel can be in an opening state at the same time by controlling the voltage difference between the pixel electrode and the common electrode, so that the light passes through the upper driving region PH1 and the lower driving region PH2 at the same time, during which the upper driving region PH1 and the lower driving region PH2 display the colors of their corresponding color zones respectively, i.e. the main aperture region PH11 of the upper driving region PH1 displays the color of the upper color region F1, the auxiliary aperture region PH12 of the upper driving region PH1 displays white color, and the lower driving region PH2 displays the color of the lower color region F2. At this moment, the color of the sub-pixel is a mixed color of the colors of the upper color region F1 and the lower color region F2. In another embodiment, the upper driving region PH1 in the sub-pixel can be in an open state and the lower driving region PH2 in the sub-pixel can be in a close state by controlling the voltage difference between the pixel electrode and the common electrode, so that the main aperture region PH11 of the upper driving region PH1 displays the color of the upper color region F1, and the auxiliary aperture region PH12 of the upper driving region PH1 displays white color. At this moment, the color of the sub-pixel is the color of the upper color region F1. In another embodiment, the upper driving region PH1 in the sub-pixel can be in a close state and the lower driving region PH2 in the sub-pixel can be in an open state by controlling the voltage difference between the pixel electrode and the common electrode, so that the upper driving region PH1 displays black color, and the lower driving region PH2 displays the color of the lower color region F2. At this moment, the color of the sub-pixel is the color of the lower color region F2.

The sub-pixel can display four types of colors at most in time division under control of the drive signal: black color; a mixed color of the colors of the upper color region F1 and the lower color region F2; the color of the upper color region F1; and the color of the lower color region F2. In the present embodiment, a multi-color display can be realized by only providing a high voltage and a low voltage to control each of the driving regions so that it is in a bright state or a dark state, which reduces power consumption of the display. Meanwhile, since the white light region configured on the color filter layer according to the present embodiment can improve light transmittance, the overall transmittance of the liquid crystal display panel is improved at the same time of realizing a multi-color display.

Figure 7:
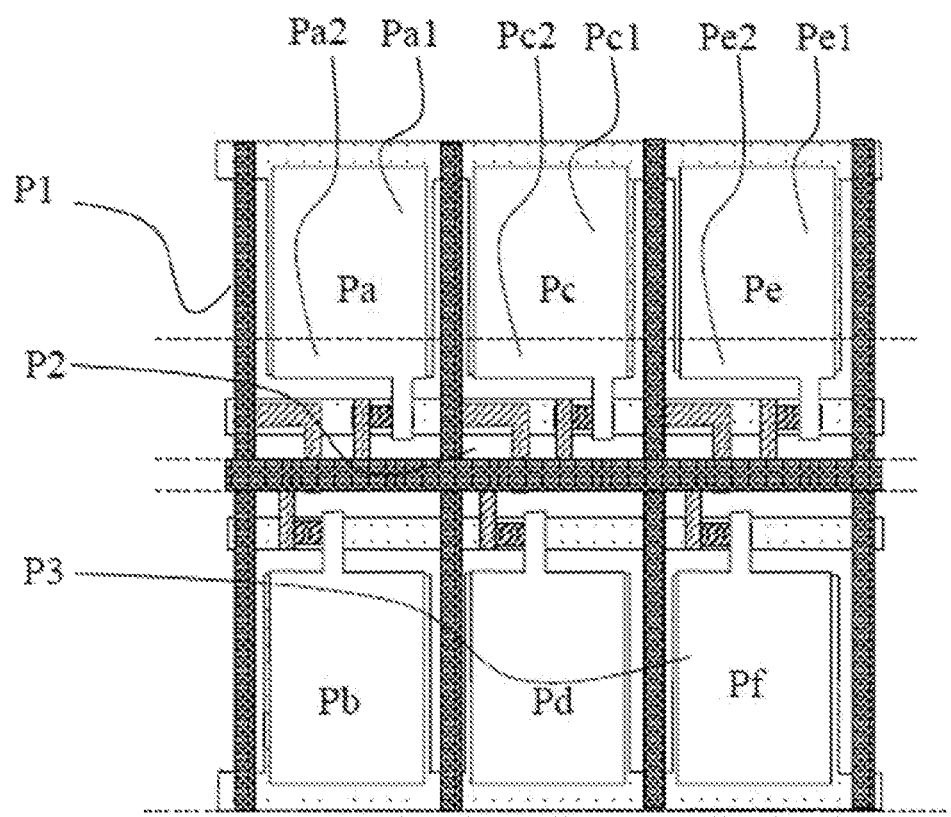
FIG. 7 illustrates a schematic diagram of an array substrate in a liquid crystal display panel provided in still another embodiment of the present disclosure.

FIG. 7 illustrates a schematic diagram of a liquid crystal display panel provided in still another embodiment of the present disclosure. In the present embodiment, the liquid crystal display panel is a reflective liquid crystal display panel, including an array substrate, a color film substrate, and a liquid crystal layer located between the array substrate and the color film substrate. The array substrate includes a drive array, which includes a plurality of data lines arranged parallel to one another and a plurality of scan lines arranged parallel to one another. The plurality of data lines and the plurality of scan lines intersect with each other to define a plurality of pixel units arranged in an array. Each of the pixel units at least includes a first sub-pixel P1, a second sub-pixel P2, and a third sub-pixel P3 that are arranged adjacent to one another. The first sub-pixel P1, the second sub-pixel P2, and the third sub-pixel P3 are arranged in the extending direction of the scan lines and have substantially the same area. The color film substrate includes a color filter layer and a common electrode located on the upper substrate. The color filter layer includes a plurality of color zones of different colors, which respectively correspond to different pixels or to different regions in each of the pixels.

The first sub-pixel P1 includes a first upper driving region Pa and a first lower driving region Pb that are arranged adjacent to one another. The first upper driving region Pa and the first lower driving region Pb are arranged in the extending direction of the data lines DL and are between two adjacent data lines DL, and have substantially the same area. The second sub-pixel P2 includes a second upper driving region Pc and a second lower driving region Pd that are arranged adjacent to one another. The second upper driving region Pc and the second lower driving region Pd are arranged in the extending direction of the data lines DL and are between two adjacent data lines DL, and have substantially the same area. The third sub-pixel P3 includes a third upper driving region Pe and a third lower driving region Pf that are arranged adjacent to one another. The third upper driving region Pe and the third lower driving region Pf are arranged in the extending direction of the data lines DL and are between two adjacent data lines DL, and have substantially the same area.

Referring to FIGS. 5 and 7 at the same time, in the present embodiment, the first sub-pixel P1, the second sub-pixel P2, and the third sub-pixel P3 share a first scan line GL1, a second scan line GL2, and a main scan line GL3. Each of the sub-pixels includes a main thin film transistor T, a first auxiliary thin film transistor T1, and a second auxiliary thin film transistor T2. In the first sub-pixel P1, a gate electrode of the main thin film transistor T is connected to the main scan line GL3, and a source electrode of the main thin film transistor T is connected to the data line DL corresponding to the first sub-pixel P1. The main thin film transistor T includes a first drain electrode and a second drain electrode. The first drain electrode of the main thin film transistor T is connected to the source electrode of the first auxiliary thin film transistor T1, and the second drain electrode of the main thin film transistor T is connected to the source electrode of the second auxiliary thin film transistor T2. The gate electrode of the first auxiliary thin film transistor T1 is connected to the first scan line GL1, the source electrode of the first auxiliary thin film transistor T1 is connected to the first drain electrode of the main thin film transistor T, and the drain electrode of the first auxiliary thin film transistor T1 is connected to the pixel electrode corresponding to the first upper driving region Pa. The gate electrode of the second auxiliary thin film transistor T2 is connected to the second scan line GL2, the source electrode of the second auxiliary thin film transistor T2 is connected to the second drain electrode of the main thin film transistor T, and the drain electrode of the second auxiliary thin film transistor T2 is connected to the pixel electrode corresponding to the first lower driving region Pb. In the second sub-pixel P2, a gate electrode of the main thin film transistor T is connected to the main scan line GL3, and a source electrode of the main thin film transistor T is connected to the data line DL corresponding to the second sub-pixel P2. The main thin film transistor T includes a first drain electrode and a second drain electrode. The first drain electrode of the main thin film transistor T is connected to the source electrode of the first auxiliary thin film transistor T1, and the second drain electrode of the main thin film transistor T is connected to the source electrode of the second auxiliary thin film transistor T2. The gate electrode of the first auxiliary thin film transistor T1 is connected to the first scan line GL1, the source electrode of the first auxiliary thin film transistor T1 is connected to the first drain electrode of the main thin film transistor T, and the drain electrode of the first auxiliary thin film transistor T1 is connected to the pixel electrode corresponding to the second upper driving region Pc. The gate electrode of the second auxiliary thin film transistor T2 is connected to the second scan line GL2, the source electrode of the second auxiliary thin film transistor T2 is connected to the second drain electrode of the main thin film transistor T, and the drain electrode of the second auxiliary thin film transistor T2 is connected to the pixel electrode corresponding to the second lower driving region Pd. In the third sub-pixel P3, a gate electrode of the main thin film transistor T is connected to the main scan line GL3, and a source electrode of the main thin film transistor T is connected to the data line DL corresponding to the third sub-pixel P3. The main thin film transistor T includes a first drain electrode and a second drain electrode. The first drain electrode of the main thin film transistor T is connected to the source electrode of the first auxiliary thin film transistor T1, and the second drain electrode of the main thin film transistor T is connected to the source electrode of the second auxiliary thin film transistor T2. The gate electrode of the first auxiliary thin film transistor T1 is connected to the first scan line GL1, the source electrode of the first auxiliary thin film transistor T1 is connected to the first drain electrode of the main thin film transistor T, and the drain electrode of the first auxiliary thin film transistor T1 is connected to the pixel electrode corresponding to the third upper driving region Pe. The gate electrode of the second auxiliary thin film transistor T2 is connected to the second scan line GL2, the source electrode of the second auxiliary thin film transistor T2 is connected to the second drain electrode of the main thin film transistor T, and the drain electrode of the second auxiliary thin film transistor T2 is connected to the pixel electrode corresponding to the third lower driving region K.

The drive array of the liquid crystal display panel further includes storage electrodes, which overlap with and form storage capacitances with the pixel electrodes in the first upper driving region Pa, the first lower driving region Pb, the second upper driving region Pc, the second lower driving region Pd, the third upper driving region Pe, and the third lower driving region Pf, respectively. In the present embodiment, the first upper driving region Pa, the first lower driving region Pb, the second upper driving region Pc, the second lower driving region Pd, the third upper driving region Pe, and the third lower driving region Pf have substantially the same area, and the overlapped area of the storage electrodes and pixel electrodes in the first upper driving region Pa, the first lower driving region Pb, the second upper driving region Pc, the second lower driving region Pd, the third upper driving region Pe, and the third lower driving region Pf are substantially the same, so that the storage capacitance and the liquid crystal capacitance are maintained identical, which improves display uniformity.

The liquid crystal display panel further includes light-proof black matrixes, which can, for example, be located on the color film substrate or on the array substrate. The black matrixes are arranged in an array for separating apart adjacent sub-pixels or different driving regions in the same sub-pixel, so as to prevent color mixture.

Figure 8:
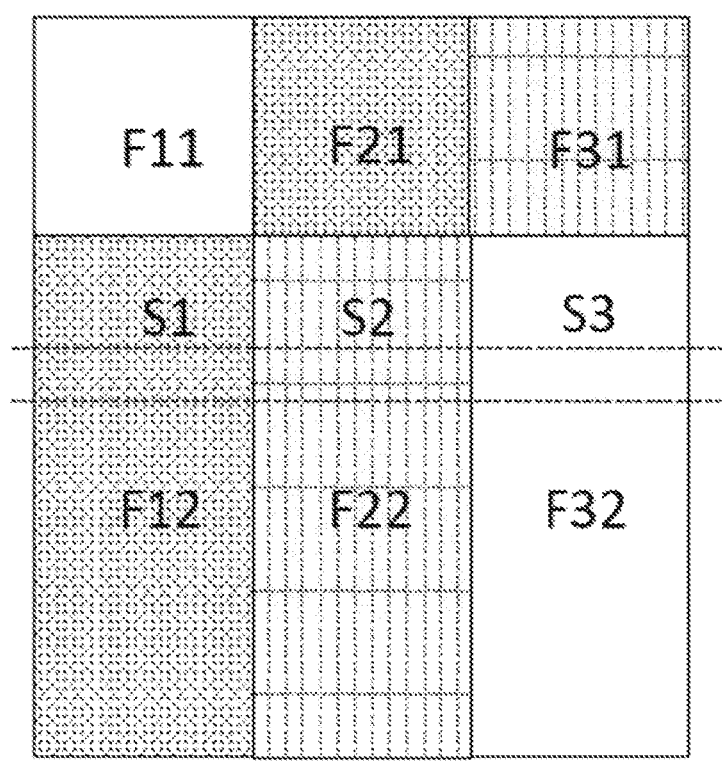
FIG. 8 illustrates a schematic diagram of formation of a color filter layer provided in still another embodiment of the present disclosure.

Furthermore, in the present embodiment, as shown in FIG. 8, the color filter layer includes an upper color region, an auxiliary color region, and a lower color region. The upper color region includes a first upper color region F11, a second upper color region F21, and a third upper color region F31. The auxiliary color region includes a first auxiliary color region S1, a second auxiliary color region S2, and a third auxiliary color region S3. The lower color region includes a first lower color region F12, a second lower color region F22, and a third lower color region F32. The first upper color region F11, the second upper color region F21, and the third upper color region F31 correspond to the main aperture region Pa1 of the first upper driving region Pa, the main aperture region Pc1 of the second upper driving region Pc, and the main aperture region Pe1 of the third upper driving region Pe, respectively. The first auxiliary color region S1, the second auxiliary color region S2, and the third auxiliary color region S3 correspond to the auxiliary aperture region Pa2 of the first upper driving region Pa, the auxiliary aperture region Pc2 of the second upper driving region Pc, and the auxiliary aperture region Pe2 of the third upper driving region Pe, respectively. The first lower color region F12, the second lower color region F22, and the third lower color region F32 correspond to the first lower driving region Pb, the second lower driving region Pd, and the third lower driving region Pf, respectively.

In the present embodiment, the auxiliary aperture region Pa2 of the first upper driving region Pa is located between the main aperture region Pa1 of the first upper driving region Pa and the first lower driving region Pb, the auxiliary aperture region Pc2 of the second upper driving region Pc is located between the main aperture region Pc1 of the second upper driving region Pc and the second lower driving region Pd, and the auxiliary aperture region Pe2 of the third upper driving region Pe is located between the main aperture region Pe1 of the third upper driving region Pe and the third lower driving region Pf. The first auxiliary color region S1 is located between the first upper color region F11 and the first lower color region F12, the second auxiliary color region S2 is located between the second upper color region F21 and the second lower color region F22, and the third auxiliary color region S3 is located between the third upper color region F31 and the third lower color region F32. The first auxiliary color region S1 and the first lower color region F12 are identical in color, the second auxiliary color region S2 and the second lower color region F22 are identical in color, and the third auxiliary color region S3 and the third lower color region F32 are identical in color.

The color configuration of each of the color zones also meets the following conditions: the color of the first upper color region F11 is different from the colors of the first auxiliary color region S1, the first lower color region F12, and the second upper color region F21, respectively. The color of the second upper color region F21 is different from the colors of the first upper color region F11, the second auxiliary color region S2, the second lower color region F22, and the third upper color region F31, respectively. The color of the third upper color region F31 is different from the colors of the second upper color region F21, the third auxiliary color region S3, and the third lower color region F32, respectively. The color of the second lower color region F22 is different from the colors of the first lower color region F12, the second upper color region F21, and the third lower color region F32, respectively.

A potential difference is formed between the pixel electrode and the common electrode by the signals from the first scan line and the main scan line and by the signals from the data lines, so as to drive the liquid crystal molecules in the liquid crystal layer to change their states. Under such a state, the external light incident from a side of the color film substrate reaches at the reflecting layer of the array substrate via the liquid crystal layer, then is reflected to the liquid crystal layer by the reflecting layer, and is thus displayed as images according to the angle configuration of the liquid crystal molecules in the liquid crystal layer. With respect to each of the driving regions in the sub-pixel, under driven of the voltage difference between the pixel electrode and the common electrode, the liquid crystal molecules in the liquid crystal layer change their states, such as being rotated and/or twisted and, meanwhile, together with a light deflecting device on the upper substrate, make each of the driving regions have a close state and an open state in time division. When a driving region is in a close state, the light reflected from the reflecting layer may not pass through the driving region, during which this driving region displays a black color. When a driving region is in an open state, the light reflected from the reflecting layer passes through the driving region, during which this driving region displays the color of its corresponding color zone. Each of the driving regions displays black color or other colors according to the requirements for displaying different images, by controlling the data signals provided by the data lines electrically connected to each of the driving regions.

For example, the first upper driving region Pa and the first lower driving region Pb in the first sub-pixel can be in a close state at the same time by controlling the voltage difference between the pixel electrode and the common electrode. At this moment, the first upper driving region Pa and the first lower driving region Pb display black color at the same time, i.e. the first sub-pixel displays black color at this moment. In another embodiment, the first upper driving region Pa and the first lower driving region Pb in the first sub-pixel can be in an open state at the same time by controlling the voltage difference between the pixel electrode and the common electrode, so that the light passes through the first upper driving region Pa and the first lower driving region Pb. At this moment, the first upper driving region Pa and the first lower driving region Pb display the colors of their corresponding color zones respectively, i.e. the main aperture region Pa1 of the first upper driving region Pa displays the color of the first upper color region F11, the auxiliary aperture region Pa2 of the first upper driving region Pa displays the color of the first auxiliary color region S1, and the first lower driving region Pb displays the color of the first lower color region F12. At this moment, the color of the first sub-pixel is a mixed color of colors of the first upper color region F11, the first auxiliary color region S1 and the first lower color region F12, which is named the first mixed color. In another embodiment, the first upper driving region Pa in the first sub-pixel can be in an open state, while the first lower driving region Pb can be in a closed state, by controlling the voltage difference between the pixel electrode and the common electrode. The main aperture region Pa1 of the first upper driving region Pa displays the color of the first upper color region F11, the auxiliary aperture region Pa2 of the first upper driving region Pa displays the color of the first auxiliary color region S1, whereas the first lower driving region Pb is in a dark state. At this moment, the color of the first sub-pixel is a mixed color of the first upper color region F11 and the first auxiliary color region S1. Since the first lower driving region Pb is in a dark state at this moment, no light passes through the first lower color region F12. Even though the first auxiliary color region S1 and the first lower color region F12 are identical in color, since little light passes through the light resistance of a certain color, the brightness is lowered, and thus the human eyes will perceive different colors. The mixed color at this moment is different from the mixed color produced when the first upper driving region Pa and the first lower driving region Pb are in open states at the same time, and this is named the second mixed color. In another embodiment, the first upper driving region Pa in the first sub-pixel can be in a close state and the first lower driving region Pb can be in an open state by controlling the voltage difference between the pixel electrode and the common electrode, so that the first upper driving region Pa displays black color, and the first lower driving region Pb displays the color of the first lower color region F12. At this moment, the color of the first sub-pixel is the color of the first lower color region F12. In other words, the first sub-pixel P1 can display four types of colors at most in time division under control of the drive signal: black color; the first mixed color of the colors of the first upper color region F11, the first auxiliary color region S1 and the first lower color region F12; the second mixed color of the colors of the first upper color region F11 and the first auxiliary color region S1; and the color of the first lower color region F12.

Similarly, the second sub-pixel P2 can also display four types of colors at most in time division under control of the drive signal: black color; a third mixed color of the colors of the second upper color region F21, the second auxiliary color region S2 and the second lower color region F22; a fourth mixed color of the colors of the second upper color region F21 and the second auxiliary color region S2; and the color of the second lower color region F22. The third sub-pixel P3 can also display four types of colors at most in time division under control of the drive signal: black color; a fifth mixed color of the colors of the third upper color region F31, the third auxiliary color region S3 and the third lower color region F32; a sixth mixed color of the colors of the third upper color region F31 and the third auxiliary color region S3; and the color of the third lower color region F32. Since the colors of adjacent color zones are different from one another in the extending direction of the scan lines in the first upper color region F11, the first lower color region F12, the second upper color region F21, the second lower color region F22, the third upper color region F31, and the third lower color region F32, and since the colors of adjacent color zones are different from one another in the extending direction of the data lines in the first upper color region F11, the first lower color region F12, the second upper color region F21, the second lower color region F22, the third upper color region F31, in addition, each of the pixel units includes a first sub-pixel, a second sub-pixel, and a third sub-pixel, in the present embodiment, the number of colors that can be displayed by each of the pixel units is: 4*4*4=64.

When driving the liquid crystal display panel provided in the present embodiment, different multiple gray-scale voltages may not be required to be provided by a drive circuit. Only a high voltage and a low voltage may not be required so as to control each of the driving regions, so that it is in a bright state or a dark state, and a 64-color display can then be realized by area segmentation of the driving region of each of the sub-pixels and by matching the color zones of different colors, which can reduce power consumption of the drive circuit in the liquid crystal display panel and realizes a 64-color display under ultra-low power consumption. Meanwhile, the voltages of the brightest state and the darkest state of the liquid crystal display panel have little influence on the brightness, i.e. the brightness variation is insensitive to the voltage variation, so the brightness variation is small even under electric leakage. Thus, driving in a lower frequency can be realized so as to further reduce power consumption of the driving. In addition, since the two driving regions in each of the sub-pixels in the liquid crystal display panel provided in the present embodiment have the same area, the storage capacitance and the liquid crystal capacitance can be maintained identical to one another. When electric leakage at low frequency occurs, the two driving regions have the same leakage performance, and the corresponding common voltages are identical to one another as well, so that problems such as flicker, image sticking, etc. may not occur, and display performance is improved.

Figure 9:
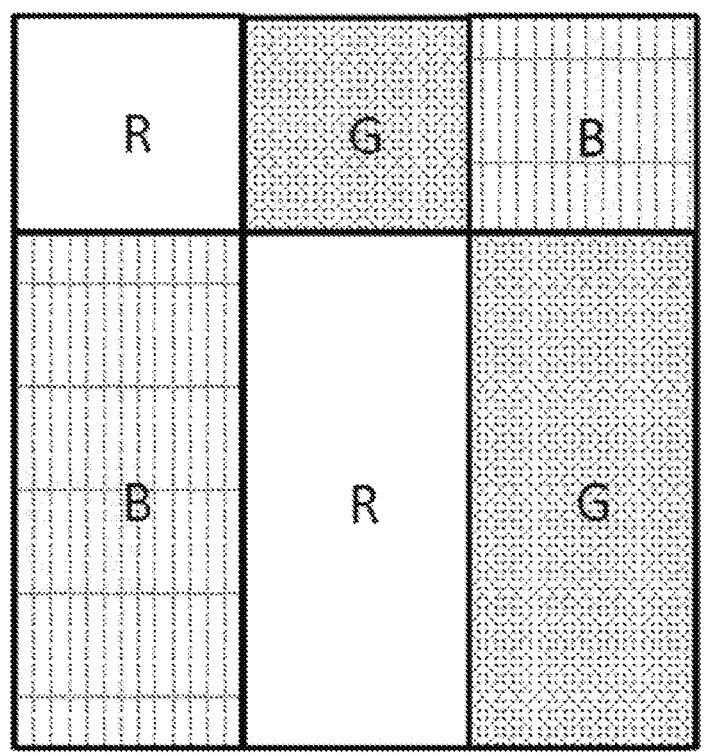
FIG. 9 illustrates a schematic diagram of formation of a color filter layer provided in still another embodiment of the present disclosure.

The colors of the first upper color region, the first lower color region, the second upper color region, the first auxiliary color region, the second auxiliary color region, the third auxiliary color region, the second lower color region, the third upper color region, and the third lower color region can be, for example, as shown in FIG. 9. FIG. 9 illustrates a schematic diagram of color formation of a type of color filter layer provided in the present disclosure. In the present embodiment, the colors of the first upper color region, the second upper color region, and the third upper color region are red R, green G, and blue B respectively, the colors of the first lower color region, the second lower color region, and the third lower color region are blue B, red R, and green G respectively, and the colors of the first auxiliary color region, the second auxiliary color region, and the third auxiliary color region are also blue B, red R, and green G respectively.

Certainly, in other embodiments, they can be configured as follows as well: the colors of the first upper color region, the second upper color region, and the third upper color region are red R, green G, and blue B respectively, the colors of the first lower color region, the second lower color region, and the third lower color region are green G, blue B, and red R respectively, and the colors of the first auxiliary color region, the second auxiliary color region, and the third auxiliary color region are also green G, blue B, and red R respectively. Once the colors of adjacent color zones are different from one another in both the extending direction of the data lines the extending direction of the scan lines in the first upper color region, the second upper color region, the third upper color region, the first lower color region, the second lower color region, and the third lower color region, a 64-color display under ultra-low power consumption can be realized.

Figure 10:
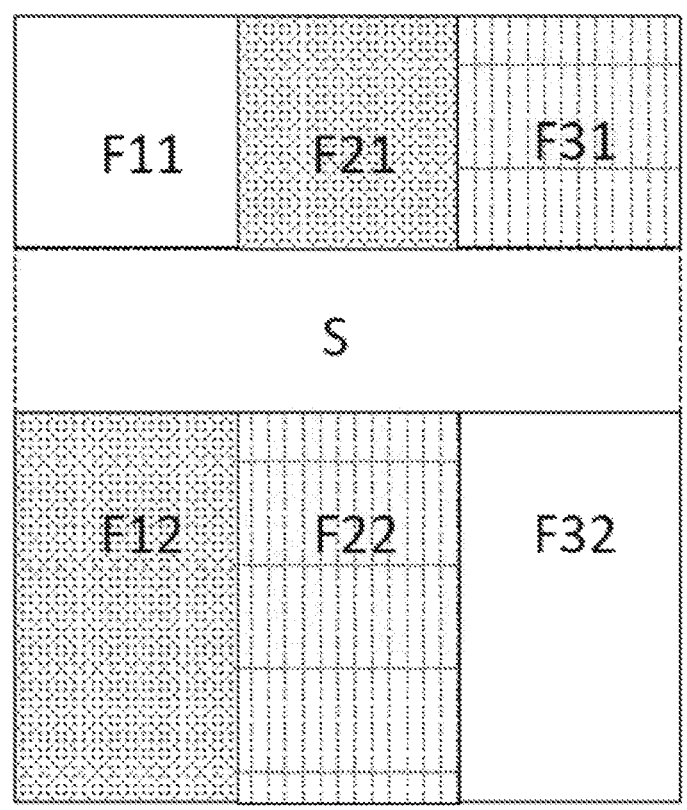
FIG. 10 illustrates a schematic diagram of formation of a color filter layer provided in yet another embodiment of the present disclosure.

FIG. 10 illustrates a structural schematic diagram of another type of color filter layer according to the present disclosure. Referring to FIGS. 7 and 10 at the same time, in the present embodiment, the color filter layer includes a first upper color region F11, a first lower color region F12, a second upper color region F21, a second lower color region F22, a third upper color region F31, a third lower color region F32, and an auxiliary color region S located between the upper color regions of the first upper color region F11, the second upper color region F21, and the third upper color region F31, and the lower color regions of the first lower color region F12, the second lower color region F22, and the third lower color region F32. The auxiliary color region S is a white light region. The first upper color region F11, the second upper color region F21, and the third upper color region F31 correspond to the main aperture region Pa1 of the first upper driving region Pa, the main aperture region Pc1 of the second upper driving region Pc, and the main aperture region Pe1 of the third upper driving region Pe, respectively. The first lower color region F12, the second lower color region F22, and the third lower color region F32 correspond to the first lower driving region Pb, the second lower driving region Pd, and the third lower driving region Pf, respectively. The auxiliary color region S corresponds to the region formed by the auxiliary aperture region Pa2 of the first upper driving region Pa, the auxiliary aperture region Pc2 of the second upper driving region Pc, and the auxiliary aperture region Pe2 of the third upper driving region Pe.

The color configuration of the color filter layer meets the following conditions: the color of the first upper color region F11 is different from the colors of the first lower color region F12 and the second upper color region F21, respectively; the color of the second upper color region F21 is different from the colors of the first upper color region F11, the second lower color region F22, and the third upper color region F31, respectively; the color of the third upper color region F31 is different from the colors of the second upper color region F21 and the third lower color region F32, respectively; and the color of the second lower color region F22 is different from the colors of the first lower color region F12, the second upper color region F21, and the third lower color region F32, respectively.

In the present embodiment, the color configuration of each of the color zones can, for example, be as follows: the colors of the first upper color region, the second upper color region, and the third upper color region are red R, green G, and blue B respectively, and the colors of the first lower color region, the second lower color region, and the third lower color region are blue B, red R, and green G respectively; alternatively, the colors of the first upper color region, the second upper color region, and the third upper color region are red R, green G, and blue B respectively, and the colors of the first lower color region, the second lower color region, and the third lower color region are green G, blue B, and red R respectively.

According to one embodiment, taking the first sub-pixel as an example, the first upper driving region Pa and the first lower driving region Pb in the first sub-pixel can be in a close state at the same time by controlling the voltage difference between the pixel electrode and the common electrode, during which the first upper driving region Pa and the first lower driving region Pb display black color at the same time, i.e. the first sub-pixel displays black color at this moment. In another embodiment, the first upper driving region Pa and the first lower driving region Pb in the first sub-pixel can be in an open state at the same time by controlling the voltage difference between the pixel electrode and the common electrode, so that the light reflected from the reflecting layer passes through the first upper driving region Pa and the first lower driving region Pb. At this moment, the first upper driving region Pa and the first lower driving region Pb display the colors of their corresponding color zones respectively, i.e. the main aperture region Pa1 of the first upper driving region Pa displays the color of the first upper color region F11, the auxiliary aperture region Pa2 of the first upper driving region Pa displays white color, and the first lower driving region Pb displays the color of the first lower color region F12. At this moment, the color of the first sub-pixel is a mixed color of the first upper color region F11 and the first lower color region F12. In another embodiment, the first upper driving region Pa in the first sub-pixel can be in an open state and the first lower driving region Pb can be in a close state by controlling the voltage difference between the pixel electrode and the common electrode, so that the main aperture region Pa1 of the first upper driving region Pa displays the color of the first upper color region F11, and the auxiliary aperture region Pa2 of the first upper driving region Pa displays white color. At this moment, the color of the first sub-pixel is the color of the first upper color region F11. In another embodiment, the first upper driving region Pa in the first sub-pixel can be in a close state and the first lower driving region Pb can be in an open state by controlling the voltage difference between the pixel electrode and the common electrode, so that the first upper driving region Pa displays black color, and the first lower driving region Pb displays the color of the first lower color region F12. At this moment, the color of the first sub-pixel is the color of the first lower color region F12. In other words, the first sub-pixel P1 can display four types of colors at most in time division under control of the drive signal: black color; a mixed color of the colors of the first upper color region F11 and the first lower color region F12; the color of the first upper color region F11; and the color of the first lower color region F12.

Similarly, the second sub-pixel P2 can also display four types of colors at most in time division under control of the drive signal: black color; a mixed color of the colors of the second upper color region F21 and the second lower color region F22; the color of the second upper color region F21; and the color of the second lower color region F22. The third sub-pixel P3 can also display four types of colors at most in time division under control of the drive signal: black color; a mixed color of the colors of the third upper color region F31 and the third lower color region F32; the color of the third upper color region F31; and the color of the third lower color region F32. Since each of the pixel units includes a first sub-pixel, a second sub-pixel, and a third sub-pixel, the number of colors that can be displayed by each of the pixel units in the present embodiment is: 4*4*4=64. A 64-color display can be realized by area segmentation of the driving region of each of the sub-pixels and by matching the color zones of different colors, which can reduce power consumption of the drive circuit in the liquid crystal display panel and realizes a multi-color display in ultra-low power consumption. Meanwhile, since the white light region configured on the color filter layer provided in the present embodiment can improve light transmittance, the overall transmittance of the liquid crystal display panel is improved at the same time of realizing a 64-color display.

In a traditional color liquid crystal display, the liquid crystal is driven by different driving voltages configured by a driving integrated circuit to display different gray scales. Taking a red (R), green (G), blue (B) tri-color liquid crystal display as an example, at least four gray scale voltages are may be required to realize a 64-color display. Reducing driving power consumption by reducing frequency may lead to a serious pixel electric leakage, cause an abnormal display brightness of the middle gray scale, and then result in a color abnormality of the images displayed. The liquid crystal display panel provided in the present disclosure uses a solution of segmentation of area of the driving region and segmentation of the color filter layer, so that a multi-color display can be realized by only providing a high voltage and a low voltage to control each of the driving regions so that it is in a bright state or a dark state, which can reduce power consumption of the drive circuit in the liquid crystal display panel and realizes a multi-color display under ultra-low power consumption. Meanwhile, the voltages of the brightest state and the darkest state of the liquid crystal display panel have little influence on the brightness, i.e. the brightness variation is insensitive to the voltage variation, so the brightness variation is small even under electric leakage. Thus, driving in a lower frequency can be realized so as to further reduce power consumption of the driving. In addition, since the two driving regions in each of the sub-pixels in the liquid crystal display panel provided in the present embodiment of the present disclosure have the same area, the storage capacitance and the liquid crystal capacitance can be maintained identical to one another. When electric leakage at low frequency occurs, the two driving regions have the same leakage performance, and the corresponding common voltages are identical to one another as well, so that problems such as flicker, image sticking, etc. may not occur, and display performance is improved.

Furthermore, the present disclosure further provides a display device including the liquid crystal display panel as described above.

What is claimed is:

1. A liquid crystal display panel, comprising:
an array substrate comprising a plurality of data lines and a plurality of scan lines, the plurality of data lines and the plurality of scan lines intersecting with one another to form a plurality of pixel units arranged in an array, and
a color filter layer comprising an upper color region, a lower color region and an auxiliary color region,
wherein the pixel units each comprise at least one sub-pixel, and the at least one sub-pixel each has a pixel electrode arranged therein,
wherein the at least one sub-pixel each comprises an upper driving region and a lower driving region that are arranged adjacent to one another, the upper driving region and the lower driving region are arranged in an extending direction of the data lines and have substantially the same area; the upper driving region comprises a main aperture region and an auxiliary aperture region,
wherein the upper color region, the lower color region, and the auxiliary color region respectively correspond to the main aperture region of the upper driving region, the lower driving region, and the auxiliary aperture region of the upper driving region; the upper color region has a color different from the lower color region and the auxiliary color region, respectively,
wherein the plurality of scan lines comprise a first scan line and a main scan line both located between the first upper driving region and the first lower driving region,
each of the sub-pixels comprises a main thin film transistor and a first auxiliary thin film transistor, a source electrode of the main thin film transistor is connected to a data line associated therewith, a first drain electrode of the main thin film transistor is connected to a source electrode of the first auxiliary thin film transistor, a gate electrode of the main thin film transistor is connected to the main scan line; a drain electrode of the first auxiliary thin film transistor is connected to a pixel electrode of the upper driving region, and a gate electrode of the first auxiliary thin film transistor is connected to the first scan line, and
wherein the scan lines further comprise a second scan line located between the upper driving region and the lower driving region, and each of the sub-pixels further comprises a second auxiliary thin film transistor, a source electrode of the second auxiliary thin film transistor is connected to a second drain electrode of the main thin film transistor, a drain electrode of the second auxiliary thin film transistor is connected to a pixel electrode of the lower driving region, and a gate electrode of the second auxiliary thin film transistor is connected to the second scan line.

2. The liquid crystal display panel according to claim 1, wherein the auxiliary aperture region of the upper driving region is located between the main aperture region of the upper driving region and the lower driving region, the auxiliary color region and the lower color region are identical in color.

3. The liquid crystal display panel according to claim 1, wherein the auxiliary color region of the color filter layer is a white light region.

4. The liquid crystal display panel according to claim 1, wherein the pixel units each further comprises a first sub-pixel, a second sub-pixel, and a third sub-pixel that are arranged adjacent to one another; the first sub-pixel, the second sub-pixel and the third sub-pixel are arranged in an extending direction of the plurality of scan lines; the first sub-pixel comprises a first upper driving region and a first lower driving region, the second sub-pixel comprises a second upper driving region and a second lower driving region, and the third sub-pixel comprises a third upper driving region and a third lower driving region;

wherein the upper color region comprises a first upper color region, a second upper color region, and a third upper color region, which respectively correspond to the main aperture region of the first upper driving region, the main aperture region of the second upper driving region, and the main aperture region of the third upper driving region; the lower color region comprises a first lower color region, a second lower color region, and a third lower color region, which respectively correspond to the first lower driving region, the second lower driving region, and the third lower driving region; the auxiliary color region comprises a first auxiliary color region, a second auxiliary color region, and a third auxiliary color region, which respectively correspond to the auxiliary aperture region of the first upper driving region, the auxiliary aperture region of the second upper driving region, and the auxiliary aperture region of the third upper driving region; and wherein a color of the first upper color region is respectively different from colors of the first auxiliary color region, the first lower color region, and the second upper color region, the color of the second upper color region is respectively different from colors of the first upper color region, the second auxiliary color region, the second lower color region, and the third upper color region, the color of the third upper color region is respectively different from colors of the second upper color region, the third auxiliary color region, and the third lower color region, the color of the second lower color region is respectively different from colors of the first lower color region, the second upper color region, and the third lower color region.

5. The liquid crystal display panel according to claim 4, wherein the auxiliary aperture region of the first upper driving region is located between the main aperture region of the first upper driving region and the first lower driving region, the auxiliary aperture region of the second upper driving region is located between the main aperture region of the second upper driving region and the second lower driving region, and the auxiliary aperture region of the third upper driving region is located between the main aperture region of the third upper driving region and the third lower driving region, and wherein the first auxiliary color region and the first lower color region are identical in color, the second auxiliary color region and the second lower color region are identical in color, and the third auxiliary color region and the third lower color region are identical in color.

6. The liquid crystal display panel according to claim 4, wherein the first auxiliary color region, the second auxiliary color region, and the third auxiliary color region are white light regions.

7. The liquid crystal display panel according to claim 5, wherein the colors of the first upper color region, the second upper color region, and the third upper color region are red, green, and blue respectively, and the colors of the first lower color region, the second lower color region, and the third lower color region are green, blue and red respectively, or the colors of the first upper color region, the second upper color region, and the third upper color region are red, green, and blue respectively, and the colors of the first lower color region, the second lower color region, and the third lower color region are blue, red, and green respectively.

8. The liquid crystal display panel according to claim 6, wherein the colors of the first upper color region, the second upper color region, and the third upper color region are red, green, and blue respectively, and the colors of the first lower color region, the second lower color region, and the third lower color region are green, blue and red respectively, or the colors of the first upper color region, the second upper color region, and the third upper color region are red, green, and blue respectively, and the colors of the first lower color region, the second lower color region, and the third lower color region are blue, red, and green respectively.

9. The liquid crystal display panel according to claim 1, wherein the array substrate further comprises a lower substrate and a reflecting layer, and the reflecting layer is located between the lower substrate of the array substrate and the color filter layer.

10. The liquid crystal display panel according to claim 4, wherein the array substrate further comprises a lower substrate and a reflecting layer, and the reflecting layer is located between the lower substrate of the array substrate and the color filter layer.

11. The liquid crystal display panel according to claim 1, wherein the liquid crystal display panel further comprises a color film substrate and a liquid crystal layer, the color film substrate comprises the color filter layer and a common electrode.

12. The liquid crystal display panel according to claim 4, wherein the liquid crystal display panel further comprises a color film substrate and a liquid crystal layer, the color film substrate comprises the color filter layer and a common electrode.

13. A display device, comprising:
a liquid crystal display panel, wherein the liquid crystal display panel comprises:
an array substrate comprising a plurality of data lines and a plurality of scan lines, the data lines and the plurality of scan lines intersecting with one another to form a plurality of pixel units arranged in an array, and
a color filter layer comprising an upper color region, a lower color region and an auxiliary color region,
wherein the pixel units each comprises at least one sub-pixel, and the at least one sub-pixel each has a pixel electrode arranged therein,
wherein the at least one sub-pixel each comprises an upper driving region and a lower driving region that are arranged adjacent to one another, the upper driving region and the lower driving region are arranged in an extending direction of the data lines and have substantially the same area; the upper driving region comprises a main aperture region and an auxiliary aperture region,
wherein the upper color region, the lower color region, and the auxiliary color region respectively correspond to the main aperture region of the upper driving region, the lower driving region, and the auxiliary aperture region of the upper driving region; the upper color region has a color different from the lower color region and the auxiliary color region, respectively,
wherein the plurality of scan lines comprise a first scan line and a main scan line both located between the first upper driving region and the first lower driving region,
each of the sub-pixels comprises a main thin film transistor and a first auxiliary thin film transistor, a source electrode of the main thin film transistor is connected to a data line associated therewith, a first drain electrode of the main thin film transistor is connected to a source electrode of the first auxiliary thin film transistor, a gate electrode of the main thin film transistor is connected to the main scan line; a drain electrode of the first auxiliary thin film transistor is connected to a pixel electrode of the upper driving region, and a gate electrode of the first auxiliary thin film transistor is connected to the first scan line, and wherein the scan lines further comprise a second scan line located between the upper driving region and the lower driving region, and each of the sub-pixels further comprises a second auxiliary thin film transistor, a source electrode of the second auxiliary thin film transistor is connected to a second drain electrode of the main thin film transistor, a drain electrode of the second auxiliary thin film transistor is connected to a pixel electrode of the lower driving region, and a gate electrode of the second auxiliary thin film transistor is connected to the second scan line.

* * * * *